United States Patent

Schellong et al.

Patent Number: 5,158,431
Date of Patent: * Oct. 27, 1992

[54] SHAFT SEAL ASSEMBLY, ESPECIALLY FOR HIGH-PRESSURE TURBOCOMPRESSORS

[75] Inventors: Helmut Schellong, Duisburg; Karl-Heinz Victor, Castrop-Rauxel; Hans-Wilhelm Laarmann, Hamm; Gustav Maser, Dortmund; Ralf Dedeken, Witten-Heven, all of Fed. Rep. of Germany

[73] Assignees: Mannesmann A.G., Dusseldorf; Pacific Wietz GmbH & Co. K.G., Dortmund, both of Fed. Rep. of Germany

[*] Notice: The portion of the term of this patent subsequent to Sep. 22, 2009 has been disclaimed.

[21] Appl. No.: 659,107

[22] Filed: Feb. 21, 1991

[30] Foreign Application Priority Data

Feb. 21, 1990 [DE] Fed. Rep. of Germany ....... 4005427

[51] Int. Cl.⁵ ............................................. F04D 29/08
[52] U.S. Cl. ................... 415/170.1; 415/110; 277/15; 277/85
[58] Field of Search .................. 415/170.1, 174.2, 110, 415/111, 112, 229, 230, 231; 277/74, 85, 81 R, 15, 3

[56] References Cited

U.S. PATENT DOCUMENTS

| 2,723,868 | 11/1955 | Hartranft | 277/81 R |
| 2,944,843 | 7/1960 | Colby | 277/81 |
| 3,511,185 | 5/1970 | Haentjens | 415/112 |
| 3,652,183 | 3/1972 | Pottharst, Jr. | 415/111 |
| 4,434,986 | 3/1984 | Warner | 277/85 |
| 4,552,368 | 11/1985 | Wallace | 277/85 |
| 4,936,821 | 6/1990 | Zuccato | 277/74 |

FOREIGN PATENT DOCUMENTS

| 1228263 | 8/1960 | France | 277/15 |
| 616994 | 4/1980 | Switzerland | 277/15 |
| 2020760 | 11/1979 | United Kingdom | 277/15 |

Primary Examiner—John T. Kwon
Attorney, Agent, or Firm—Herbert Dubno

[57] ABSTRACT

A turbocompressor shaft seal, especially for a high-pressure turbocompressor, has each of its gas-side and atmosphere-side slide rings biased toward a rotor ring of the shaft and associated with blocking-liquid compartments which are interconnected by an annular passage around the rotor ring. The compartments are connected in a closed circulation path with a circulating pump and a cooler and leakage liquid is returned by a feed pump to the liquid circulation with the aid of a pressure transformer biased on one side by the gas pressure to be sealed and an adjustable spring force and, on the other side, by the pressure of the blocking liquid.

13 Claims, 2 Drawing Sheets

SHAFT SEAL ASSEMBLY, ESPECIALLY FOR HIGH-PRESSURE TURBOCOMPRESSORS

CROSS REFERENCE TO RELATED APPLICATION

This application is related to the commonly-owed copending application Ser. No. 07/659,105 filed Feb. 21, 1991.

FIELD OF THE INVENTION

Our present invention relates to a blocking-liquid sealing arrangement for a shaft seal of a turbocompressor, especially a high-pressure turbocompressor. More particularly, the invention relates to a shaft seal assembly in which a blocking liquid is used to support a seal between a gas space of a turbocompressor and the external atmosphere formed by relatively rotating juxtaposed sealing surfaces.

BACKGROUND OF THE INVENTION

It is known to provide a blocking liquid in a shaft seal to assist in the sealing action between the gas space and the atmosphere of relatively rotating sealing members.

The blocking-liquid sealing arrangement of the prior art, over which the present invention constitutes an improvement, operates with a floating ring seal. Floating ring seals are radial gap seals with play between the rotating shaft and the sealing rings connected with the seal housing and radially movable therein.

The purpose of the blocking-liquid sealing arrangement is to support the sealing action by providing a liquid pressure which is greater than the gas pressure against which the seal is provided. The pressure difference is generally small in the conventional units, for the most part about 0.5 bar. This pressure differential is small to keep the internal leakage quantities at the gas-side sealing ring as small as possible. The radial gap at the outer sealing ring is so dimensioned that the rate of flow of the blocking liquid can constitute a coolant stream capable of providing the requisite cooling of the gas-side sealing ring. The volume rate of flow of the coolant stream is generally proportional to the sealing pressure.

That means that an optimum cooling can only be provided for a given pressure range and that the turbocompressor must be limited in versatility to operate in this range. Stated otherwise, for a turbocompressor in which the blocking liquid forms the coolant and the flow of the coolant is determined by the radial gap in the outer sealing ring, the operating pressure range of the turbocompressor must be limited.

In addition, at high pressures, the control of the pressure difference between the blocking liquid on the one hand and the gas space to be sealed on the other is difficult, because the pressure difference, by comparison to the gas pressure to be sealed, is very small. The control is effected by an applied pressure regulation and an indirect pressure difference regulation by control of the liquid level of the blocking liquid in a reservoir therefor. The generated pressure difference is proportional to the geodetic height of the blocking liquid in this reservoir relative to the shaft of the turbocompressor.

The blocking liquid is brought to an elevated pressure by the high-pressure pump and is depressurized in the radial gap of the outer floating ring to atmospheric pressure. The amount of the blocking-liquid source in the elevated reservoir must be sufficient to provide a controlled action of the seal upon failure of the blocking-liquid supply. Upon standstill of the turbocompressor under pressure, the blocking-liquid system must be maintained in operation to maintain the seal. Since the blocking-liquid system is an open system, the cost of operation is substantial.

OBJECTS OF THE INVENTION

It is, therefore, the principal object of the present invention to provide a blocking-liquid shaft seal assembly of far simpler construction than the earlier system described above which operates with reduced internal leakage and which affords pressure-difference regulation in a simpler manner.

A more general object of this invention is to provide an improved shaft-seal assembly for a turbocompressor, and particularly a high-pressure turbocompressor, which obviates drawbacks of earlier systems.

SUMMARY OF THE INVENTION

These objects and others which will become apparent hereinafter are attained, in accordance with the invention, in a turbocompressor provided with a shaft-seal assembly or a shaft-seal assembly for a turbocompressor which comprises:

a shaft;

a housing surrounding the shaft and formed with a pressurized gas space to be sealed from the atmosphere;

a gas-side axially sealing slide ring surrounding the shaft, received in the housing and angularly fixed therein;

an atmosphere-side axially sealing slide ring surrounding the shaft, received in the housing and angularly fixed therein;

a rotor ring on the shaft between the slide rings and having opposite sealing surfaces respectively juxtaposed with sealing surfaces of the slide rings;

a respective blocking-liquid compartment formed in the housing and open toward each of the slide rings outwardly thereof;

an annular passage formed in the housing around a periphery of the rotor ring and interconnecting the compartments, the atmosphere-side slide ring sealing the respective compartment against the atmosphere and the gas-side slide ring sealing the respective compartment against the gas space; and means for connecting both of the compartments in a blocking-liquid circulation path including a pump and a cooler.

According to the invention, therefore, the two axially sealing slide rings surrounding the shaft are juxtaposed with and sealingly cooperate with a rotor ring carried by a shaft and either engage the latter directly or have sealing surfaces which cooperate with those of the rotor ring to form a gas-flow-preventing seal therebetween, each of these slide rings having associated therewith a respective blocking-liquid compartment and the two blocking-liquid compartments being interconnected along the outer periphery of the rotor ring. According to the invention, the two blocking-liquid compartments are connected in a closed blocking-liquid circulation path with a pump and a cooler.

The gas-side seal operates preferably in the mixed friction range. In accordance with the principles of the invention, the gas-side slide ring is connected to the housing by a multifold bellows so as to be axially and radially movable in the housing whereas the atmosphere-side slide ring is supported in the housing for such axial and radial movement by secondary elements, for example, one or more springs and at least one O ring.

The pressing force of the gas-side slide ring against or toward the rotor ring is determined by the bellows and the effective hydraulic pressure difference between the blocking liquid and the gas. The pressing force of the atmosphere-side slide ring is determined by the springs and the effective hydraulic pressure of the blocking liquid.

It will be understood that the bellows can be replaced by another sealing system, e.g. formed by an O ring and spring elements if desired.

According to a feature of the invention, the internal leakage liquid of the blocking liquid is lead by a pipe to a separator, i.e. a gas/liquid separator, from which the blocking liquid is returned to the blocking-liquid circulation path by a feed pump and a pressure transformer.

The pressure transformer according to a preferred embodiment of the invention is biased on one side by the gas pressure to be sealed and an adjustable spring force. At its other side, the pressure transformer communicates with the liquid in the blocking-liquid circulation path so that the pressure transformer will determine the pressure in the blocking-liquid circulation path. The pressure transformer can simultaneously form a blocking-liquid storage vessel or reservoir.

The blocking-liquid sealing assembly of the invention provides a gas-side seal by a slide ring which operates with low leakage and preferably in the mixed-friction range described above. The atmosphere-side seal is an axial-gap seal whose sealing surfaces in the dynamic state are separated by a liquid film formed hydrodynamically. Mixed friction arises when in the sealing gap a supporting lubricant film is formed but which can partly be broken. Depending upon the characteristics of the lubricant and the friction characteristics of the two frictionally engageable surfaces, the friction characteristics and coefficient between the surfaces will be determined. In the liquid-friction range, the hydrodynamically-formed liquid film determines the friction coefficient exclusively as a function of the dynamic viscosity of the lubricant.

The leakage quantity of the system can be used for controlling the function thereof. It can, for example, be held sufficiently small that any further control devices of the system never need exceed their limits of reliability or their normal operation ranges. The liquid circulation is closed. That means that the blocking liquid in the shaft-seal assembly of the invention remains at the sealing pressure at all times.

The circulation is effected by a circulation pump which circulates the blocking liquid at a rate exceeding the flow resistance and sufficient to effect cooling. The friction loss in the form of heat is dissipated at the cooler. Any losses through the axial gaps of the slide ring in very small leakage quantities can be intermittently returned to the fluid circulation path with a comparatively small feed pump.

The system of the invention has the advantage that leakage quantities of the blocking-liquid shaft seal assembly of the invention are far smaller than in the case of floating-ring seals of the type previously described. As a consequence, the difficulties with open blocking-liquid systems are eliminated. It is possible to operate with a closed blocking-liquid system and thereby control the pressure difference in a simple manner.

Furthermore, elevated vessels and high-capacity blocking-liquid pumps as well as the customary pressure-difference control valves are no longer required.

In addition, the system of the invention provides a clear energy saving. The cooling of the seals is independent from the pressure level. Of especial advantage are the small internal leakage and the standstill sealing effects. The slide rings and the rotor ring can be composed of materials of long useful life and, for example, hard material/hard material pairings can be provided at the sealing surfaces so that the slide rings and the rotor ring cooperate in a low-wear or wear-free operation.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
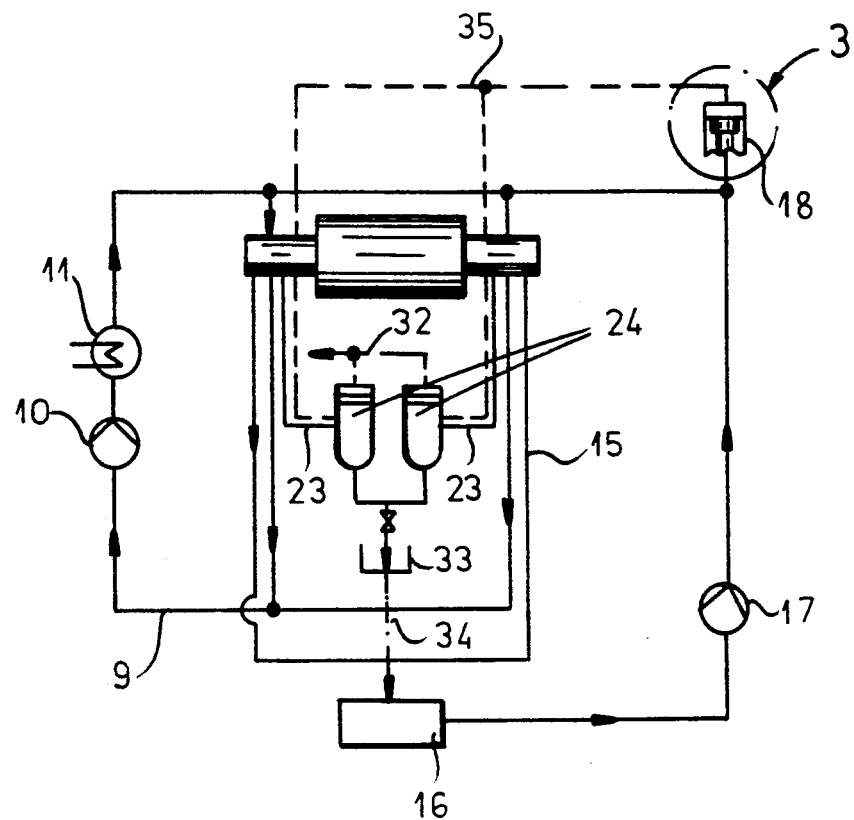
FIG. 1 is a flow diagram illustrating a turbocompressor provided with the shaft seal assemblies of the invention.

The sealing arrangement shown in the drawing comprises a gas-side axially sealing slide ring 1 and an atmosphere-side axially sealing slide ring 2, both of which are held against rotation in the sealing housing 3 and surround the shaft 4 of the turbocompressor.

A rotor ring 5 is affixed to the shaft 4 and has opposing sealing surfaces 5a and 5b, respectively cooperating with the end faces of the slide rings 1 and 2 to form seals between a gas-pressure space represented at 30 and the atmosphere 31.

Each of the slide rings 1 and 2 is associated with a blocking-liquid compartment 7 or 6, respectively. The two blocking-liquid compartments 6, 7 are interconnected by an annular passage 8 formed along the periphery of the rotor ring 5.

The atmosphere-side slide ring 2 seals the respective blocking-liquid compartment 6 against the atmosphere at 31. The gas-side slide ring 1 seals the respective blocking-liquid compartment 7 against the gas space 30 of the turbocompressor.

The two blocking-liquid compartments 6, 7 form part of a closed liquid-circulation path represented generally at 9 and provided with a pump 10 and a cooler 11, the latter dissipating the heat generated in the seal.

The pump 10 represented schematically in FIG. 1 can also be formed by the rotor ring 5 when the latter is constituted as a pump rotor and is in that case integrated directly in the seal.

Figure 2:
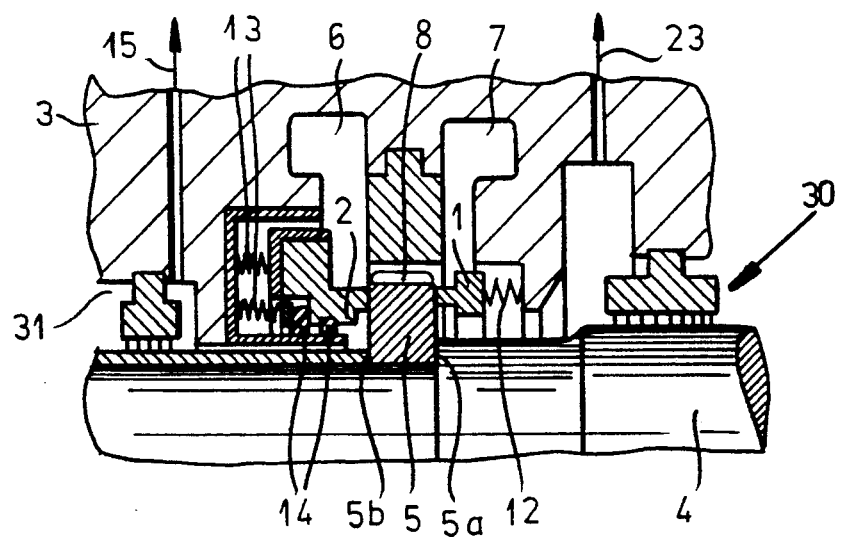
FIG. 2 is an axial cross sectional view of the left-hand shaft seal of FIG. 1, drawn to a larger scale.

From FIG. 2 it will be apparent that the gas-side slide ring 1 is held by a multifold bellows 12 on the housing 3, the bellows 12 surrounding the shaft 4.

The atmosphere-side slide ring 2 is held by secondary elements in the form of springs 3 and O rings 4 so that both slide rings are capable of axial movement and radial movement relative to the housing and to the shaft. The internal leakage of the blocking liquid is drawn off by lines 23 from the respective seals to a respective gas-liquid separator from which the separated gas is discharged at 32. The liquid passes into a collecting reservoir 33, and after suitable treatment represented by the dot-dash line 34, e.g. a filtering, is supplied to a tank 16. External leakage is collected by the lines 15 and delivered to the tank 16 as well.

The leakage is recirculated to the circulation 9 via a feed pump 17 and a pressure transformer 18.

Figure 3:
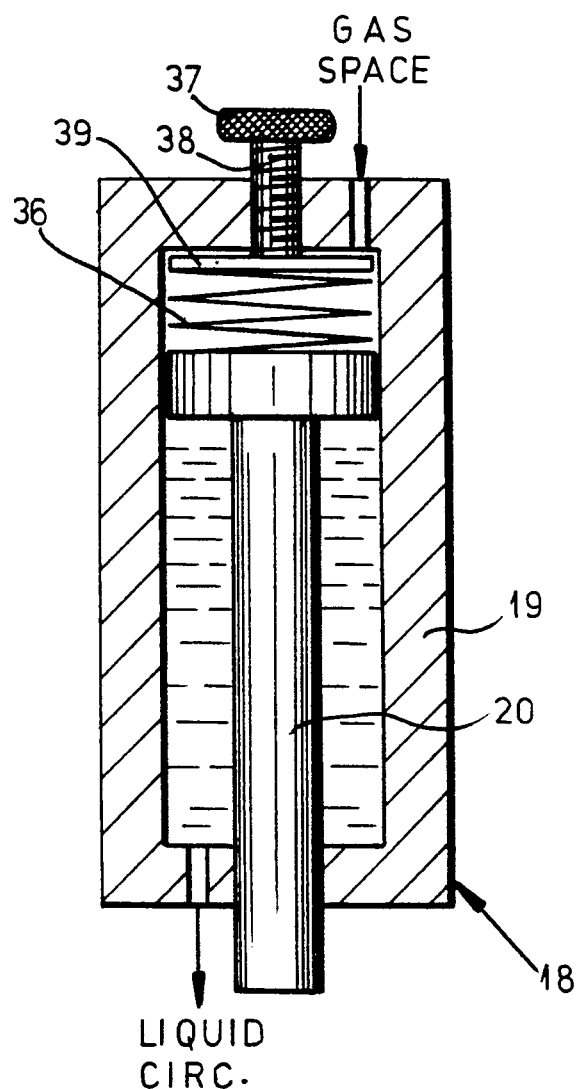
FIG. 3 is a diagrammatic section through the pressure transformer illustrated in FIG. 1.

The pressure transformer 18 shown in FIGS. 1 and 3 can comprise a piston 20 which is axially shiftable in the pressure cylinder 19. On one side of this pressure transformer, the pressure from the gas space 30 is applied as represented by the lines 35 in FIG. 1. This pressure is applied together with the force of a spring 36 which force is adjustable, e.g. by rotating the milled head 37 of an adjusting screw 38 carrying a plate 39 against which the spring 36 is seated.

By adjustment of the spring force, we are able to adjust the pressure in the blocking-fluid circulation 9 which is connected to the other side of the pressure transformer. The pressure transformer 18 also forms a blocking-liquid storage reservoir.

The pressure difference between the gas in the space 30 to be sealed and the blocking liquid is generated in the pressure transformer 18 in which the piston 20 is axially movable.

As noted, one side of the piston is biased by the blocking-liquid pressure while the other side is biased by the pressure of the gas to be sealed and a spring force. The pressure transformer generates a pressure difference between the liquid and the gas which is independent of the gas pressure. Since the pressure transformer simultaneously forms a blocking-liquid reservoir, it can maintain the liquid under pressure in the compartments 6 and 7 even for comparatively long standstill times of the turbocompressor.

We claim:

1. A shaft seal assembly for a turbocompressor, comprising:
   a shaft;
   a housing surrounding said shaft and formed with a pressurized gas space to be sealed from the atmosphere;
   a gas-side axially sealing slide ring surrounding said shaft, received in said housing and angularly fixed therein;
   an atmosphere-side axially sealing slide ring surrounding said shaft, received in said housing and angularly fixed therein;
   a rotor ring on said shaft between said slide rings and having opposite sealing surfaces respectively juxtaposed with sealing surfaces of said slide rings;
   a respective blocking-liquid compartment formed in said housing and open toward each of said slide rings outwardly thereof;
   an annular passage formed in said housing around a periphery of said rotor ring and interconnecting said compartments, said atmosphere-side slide ring sealing the respective compartment against the atmosphere and said gas-side slide ring sealing the respective compartment against said gas space; and
   means for connecting both of said compartments in a blocking-liquid circulation path including a pump and a cooler.

2. The shaft seal assembly for a turbocompressor defined in claim 1, further comprising a multifold bellows surrounding said shaft and connecting said gas-side slide ring with said housing for axial and radial movement therein.

3. The shaft seal assembly for a turbocompressor defined in claim 2, further comprising means for mounting said atmosphere-side slide ring in said housing for axial and radial movement therein.

4. The shaft seal assembly for a turbocompressor defined in claim 3, further comprising a line collecting internal leakage liquid, a gas/liquid separator connected to said line for separating blocking liquid from gas, and a feed pump and a pressure transformer for feeding blocking liquid from said gas/liquid separator to said blocking-liquid circulation path.

5. The shaft seal assembly for a turbocompressor defined in claim 4 wherein said pressure transformer has one side connected to receive pressure from said gas space and a spring force, and another side communicating with said blocking-liquid circulation path and at a pressure thereof.

6. The shaft seal assembly for a turbocompressor defined in claim 5 wherein said pressure transformer forms a blocking-liquid storage reservoir for supplying said blocking-liquid circulation path.

7. The shaft seal assembly for a turbocompressor defined in claim 1, further comprising means for mounting said atmosphere-side slide ring in said housing for axial and radial movement therein.

8. The shaft seal assembly for a turbocompressor defined in claim 1, further comprising a line collecting internal leakage liquid, a gas/liquid separator connected to said line for separating blocking liquid from gas, and a feed pump and a pressure transformer for feeding blocking liquid from said gas/liquid separator to said blocking-liquid circulation path.

9. The shaft seal assembly for a turbocompressor defined in claim 8 wherein said pressure transformer has one side connected to receive pressure from said gas space and a spring force, and another side communicating with said blocking-liquid circulation path and at a pressure thereof.

10. The shaft seal assembly for a turbocompressor defined in claim 9 wherein said pressure transformer forms a blocking-liquid storage reservoir for supplying said blocking-liquid circulation path.

11. The shaft seal assembly for a turbocompressor defined in claim 8 wherein said pressure transformer forms a blocking-liquid storage reservoir for supplying said blocking-liquid circulation path.

* * * * *